United States Patent
Bhogal et al.

(10) Patent No.: US 9,294,792 B2
(45) Date of Patent: *Mar. 22, 2016

(54) DYNAMIC REBROADCAST SCHEDULING OF VIDEOS

(71) Applicant: International Business Machines Corporation, Armonk, NY (US)

(72) Inventors: Kulvir S. Bhogal, Pflugerville, TX (US); Gregory J. Boss, Saginaw, MI (US); Rick A. Hamilton, II, Charlottesville, VA (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 140 days.

This patent is subject to a terminal disclaimer.

(21) Appl. No.: 14/085,406

(22) Filed: Nov. 20, 2013

(65) Prior Publication Data

US 2014/0082652 A1    Mar. 20, 2014

Related U.S. Application Data

(63) Continuation of application No. 12/055,031, filed on Mar. 25, 2008, now Pat. No. 8,689,266.

(51) Int. Cl.
  *H04N 21/25* (2011.01)
  *H04N 21/24* (2011.01)
  *H04N 7/173* (2011.01)
  *H04N 21/262* (2011.01)
  (Continued)

(52) U.S. Cl.
  CPC ....... *H04N 21/2408* (2013.01); *H04N 7/17318* (2013.01); *H04N 21/252* (2013.01); *H04N 21/262* (2013.01); *H04N 21/4622* (2013.01); *H04N 21/4828* (2013.01); *H04N 21/858* (2013.01)

(58) Field of Classification Search
  None
  See application file for complete search history.

(56) References Cited

U.S. PATENT DOCUMENTS 5,978,766 A    11/1999   Luciw
6,088,722 A *  7/2000   Herz .................... G06Q 20/383
                                                      348/E07.056

(Continued)

FOREIGN PATENT DOCUMENTS

JP        2003319308        11/2003

OTHER PUBLICATIONS

"U.S. Appl. No. 11/553,007 Notice of Allowance", Sep. 15, 2010, 6 pages.

(Continued)

*Primary Examiner* — Cai Chen
(74) *Attorney, Agent, or Firm* — DeLizio Law, PLLC

(57) ABSTRACT

Some embodiments include a method for managing rebroadcast of a previously broadcast video. The method includes a computer determining popularity of the previously broadcast video based, at least in part, on a number of requests to rebroadcast the previously broadcast video. The method includes the computer determining a popularity threshold based in part on demographics of viewers sending the number of requests to rebroadcast the previously broadcast video. The method includes the computer determining that the popularity of the previously broadcast video exceeds the popularity threshold, and in response, the computer determining a day of week and time of day to rebroadcast the previously broadcast video based in part on days of the week and times of day in which the requests were sent.

20 Claims, 9 Drawing Sheets

(51) Int. Cl.
*H04N 21/462* (2011.01)
*H04N 21/482* (2011.01)
*H04N 21/858* (2011.01)

(56) References Cited

U.S. PATENT DOCUMENTS

| | | | |
|---|---|---|---|
| 6,351,596 | B1 | 2/2002 | Ostrover |
| 6,601,074 | B1 | 7/2003 | Liebenow |
| 6,614,987 | B1 | 9/2003 | Ismail et al. |
| 6,625,503 | B1 | 9/2003 | Smith |
| 6,934,964 | B1 | 8/2005 | Schaffer et al. |
| 7,020,893 | B2 | 3/2006 | Connelly |
| 7,055,168 | B1 | 5/2006 | Errico et al. |
| 7,096,486 | B1 | 8/2006 | Ukai et al. |
| 7,394,967 | B1 | 7/2008 | Potrebic et al. |
| 7,570,870 | B2 | 8/2009 | Ellis |
| 7,665,111 | B1 | 2/2010 | Barton et al. |
| 7,752,643 | B2 | 7/2010 | Ito et al. |
| 7,877,765 | B2 | 1/2011 | Bhogal et al. |
| 7,882,528 | B1 | 2/2011 | Taylor et al. |
| 8,561,108 | B2 | 10/2013 | Bhogal et al. |
| 2001/0049824 | A1 | 12/2001 | Baker et al. |
| 2002/0056087 | A1 | 5/2002 | Berezowski et al. |
| 2002/0174430 | A1 | 11/2002 | Ellis et al. |
| 2002/0188947 | A1 | 12/2002 | Wang et al. |
| 2002/0199193 | A1 | 12/2002 | Gogoi et al. |
| 2003/0190150 | A1 | 10/2003 | Kawasaki et al. |
| 2003/0212708 | A1 | 11/2003 | Potrebic et al. |
| 2004/0001081 | A1 | 1/2004 | Marsh |
| 2004/0019906 | A1 | 1/2004 | Shintani et al. |
| 2004/0091236 | A1 | 5/2004 | Boston et al. |
| 2004/0111750 | A1 | 6/2004 | Stuckman et al. |
| 2004/0187164 | A1 | 9/2004 | Kandasamy et al. |
| 2004/0244030 | A1 | 12/2004 | Boyce et al. |
| 2005/0050578 | A1 | 3/2005 | Ryal |
| 2005/0060743 | A1 | 3/2005 | Ohnuma et al. |
| 2005/0132400 | A1 | 6/2005 | Liao et al. |
| 2005/0132401 | A1 | 6/2005 | Boccon-Gibod et al. |
| 2005/0149987 | A1 | 7/2005 | Boccon-Gibod et al. |
| 2006/0100987 | A1 | 5/2006 | Leurs |
| 2006/0136966 | A1 | 6/2006 | Folk, II |
| 2006/0140584 | A1 | 6/2006 | Ellis et al. |
| 2006/0174300 | A1 | 8/2006 | Gu et al. |
| 2006/0294538 | A1 | 12/2006 | Li et al. |
| 2006/0294548 | A1 | 12/2006 | Potrebic et al. |
| 2007/0033607 | A1 | 2/2007 | Bryan |
| 2007/0079342 | A1 | 4/2007 | Ellis et al. |
| 2007/0113244 | A1 | 5/2007 | Verschueren et al. |
| 2007/0122108 | A1 | 5/2007 | Bontempi |
| 2007/0136753 | A1* | 6/2007 | Bovenschulte ........ H04H 60/31 725/46 |
| 2007/0154163 | A1 | 7/2007 | Cordray |
| 2007/0157247 | A1 | 7/2007 | Cordray |
| 2007/0157249 | A1 | 7/2007 | Cordray |
| 2007/0233571 | A1 | 10/2007 | Eldering et al. |
| 2007/0245378 | A1 | 10/2007 | Svendsen |
| 2007/0248317 | A1 | 10/2007 | Bahn |
| 2008/0066106 | A1 | 3/2008 | Ellis et al. |
| 2008/0101763 | A1 | 5/2008 | Bhogal et al. |
| 2008/0115166 | A1 | 5/2008 | Bhogal et al. |
| 2008/0243633 | A1 | 10/2008 | Spiegelman |
| 2008/0247724 | A1 | 10/2008 | Potrebic et al. |
| 2009/0092183 | A1 | 4/2009 | O'Hern |
| 2009/0249397 | A1 | 10/2009 | Bhogal et al. |
| 2009/0249409 | A1 | 10/2009 | Bhogal et al. |

OTHER PUBLICATIONS

"U.S. Appl. No. 12/054,982 Notice of Allowance", Jun. 10, 2013, 20 pages.
"U.S. Appl. No. 12/054,982 Notice of Allowance", Sep. 6, 2012, 8 pages.
"U.S. Appl. No. 11/553,001 Office Action", Nov. 4, 2009, 24 pages.
"U.S. Appl. No. 11/553,001 Final Office Action", Jun. 9, 2009, 22 pages.
"U.S. Appl. No. 11/553,001 Final Office Action", Apr. 28, 2010, 31 pages.
"U.S. Appl. No. 11/553,001 Office Action", Dec. 23, 2008, 20 pages.
"U.S. Appl. No. 11/553,007 Final Office Action", Mar. 3, 2010, 11 pages.
"U.S. Appl. No. 11/553,007 Office Action", Sep. 16, 2009, 12 pages.
"U.S. Appl. No. 12/054,982 Final Office Action", Nov. 18, 2011, 17 pages.
"U.S. Appl. No. 12/054,982 Final Office Action", May 9, 2011, 18 pages.
"U.S. Appl. No. 12/054,982 Final Office Action", Mar. 28, 2012, 20 pages.
"U.S. Appl. No. 12/054,982 Office Action", Nov. 18, 2011, 17 pages.
"U.S. Appl. No. 12/055,031 Final Office Action", Mar. 15, 2011, 12 pages.
"U.S. Appl. No. 12/055,031 Final Office Action", Aug. 27, 2012, 19 pages.
"U.S. Appl. No. 12/055,031 Office Action", Sep. 2, 2010, 13 pages.
"U.S. Appl. No. 12/055,031 Office Action", Apr. 10, 2012, 21 pages.
Crenshaw, Bob et al., "History Assist when Selecting TV Shows", RD n446 Jun. 2001 Article 119 http://ip.com/pdf/ipcompad/IPCOM000014540D.pdf?free=priorartdatabase Jun. 1, 2001, p. 1004.

* cited by examiner

DYNAMIC REBROADCAST SCHEDULING OF VIDEOS

RELATED APPLICATIONS

This application is a Continuation of and claims the priority benefit of U.S. application Ser. No. 12/055,031 filed Mar. 25, 2008.

BACKGROUND

Embodiments of the inventive subject matter generally relate to the field of video recording, and, more particularly, to dynamic rebroadcast scheduling of videos.

A digital video recorder (DVR) (a.k.a. personal video recorder or PVR) is a device that records audio and video content in a digital format to a disk drive or other medium. DVRs include stand-alone set-top boxes and software for personal computers, where the software enables content capture and playback to and from disk. DVRs provide convenient "time shifting" and other features, such as pausing live TV, instant replay of scenes, chasing playback, skipping advertising, etc. Most DVRs use a Motion Pictures Expert Group format for encoding video signals.

Many television programs are presented as a series of related episodes that are intended to be viewed sequentially. A viewer may want to begin watching a television series, but has missed some of the episodes and does not want to wait for several months for the series to be released on DVD. A viewer may also want to watch a previously viewed episode again.

SUMMARY

Some embodiments include a method for managing rebroadcast of a previously broadcast video. The method includes a computer determining popularity of the previously broadcast video based, at least in part, on a number of requests to rebroadcast the previously broadcast video. The method includes the computer determining a popularity threshold based in part on demographics of viewers sending the number of requests to rebroadcast the previously broadcast video. The method includes the computer determining that the popularity of the previously broadcast video exceeds the popularity threshold, and in response, the computer determining a day of week and time of day to rebroadcast the previously broadcast video based in part on days of the week and times of day in which the requests were sent.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to digital video recorders and personal video recorders, embodiments can be implemented with a video game console, a portable video recording device, a computer, etc. In other instances, well-known instruction instances, protocols, structures and techniques have not been shown in detail in order not to obfuscate the description.

Viewing episodes of a video series in order allows for a good viewing experience and understanding of episode content of the individual episodes. Functionality can be implemented in a video recording device and/or at a content provider to collect data about viewing behavior to determine if a user(s) tends to view episodes of a series in order. The video recording device and/or content provider can also keep track of partially or fully viewed episodes and episodes that are ready for viewing to avoid acquiring already viewed episodes. Being able to quickly catch up on missed episodes will allow for easier introduction to a video series and prevent viewers from abandoning programs. In addition, requests for particular episodes can be leveraged for dynamic episode scheduling and dynamic setting of advertisement rates.

Figure 1:
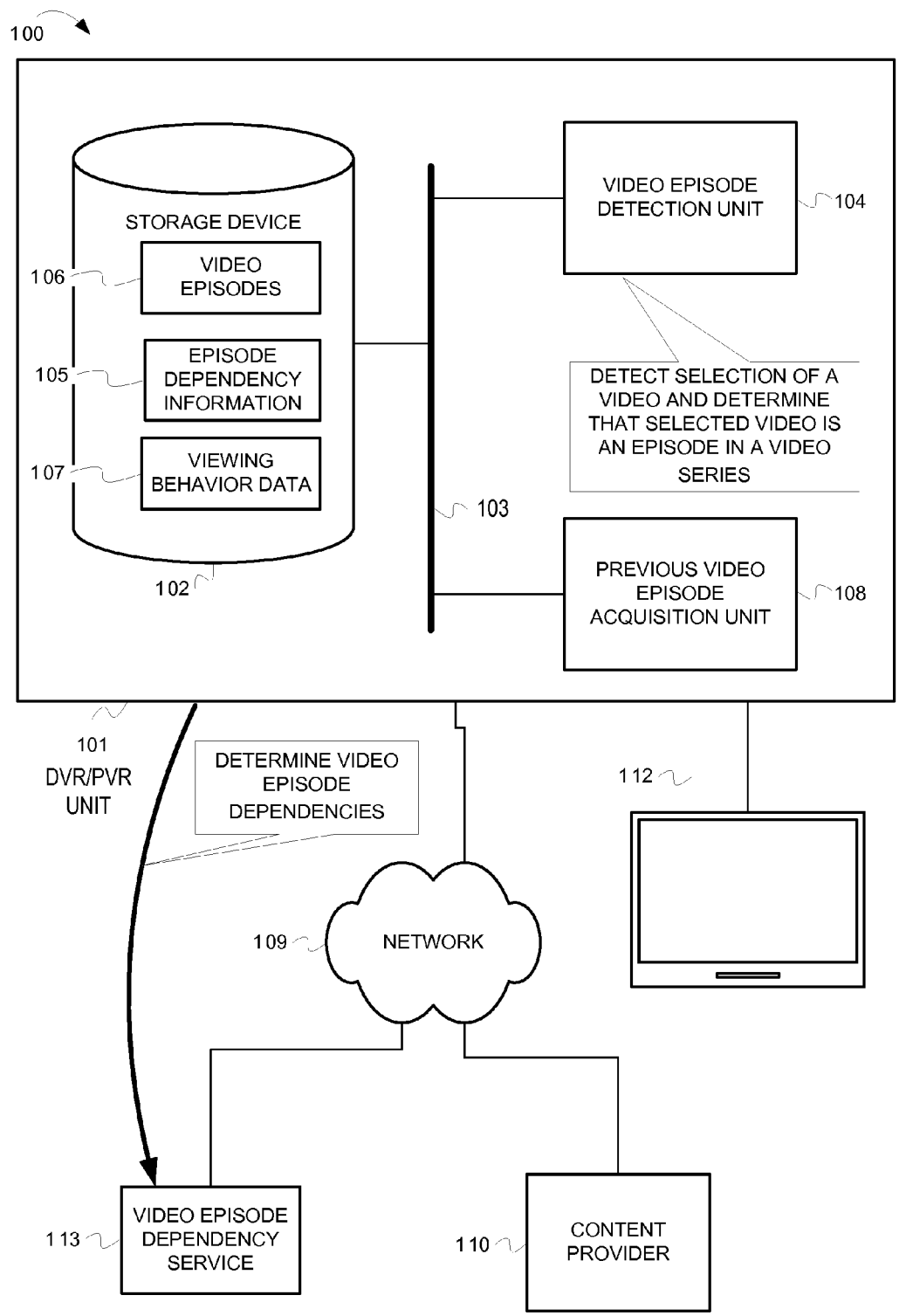
FIG. 1 illustrates an example content delivery system 100.

FIG. 1 illustrates an example content delivery system 100. The content delivery system includes a digital video recorder/personal video recorder (DVR/PVR) unit 101, display device 112 (e.g., television, monitor, projector, etc.), network 109, content provider 110, and video episode dependency service 113. The content provider 110 can provide television content via a cable television infrastructure (e.g., optical fiber, coaxial cables, etc.) or other infrastructures, such as digital subscriber lines (DSL). The DVR unit 101 includes a storage device 102, video episode detection unit 104, and previous episode acquisition unit 108, all of which are connected via a bus 103. Although FIG. 1 shows the DVR's components connected via a bus 103, the components can be connected using other technologies (e.g., software interfaces). The storage device 102 hosts video episodes 106, episode dependency information 105, and viewing behavior data 107. Although FIG. 1 shows the episode dependency information being stored locally, the episode dependency information may be stored remotely, previously retrieved from a remote source, refreshed from a remote source, etc. In this illustration, the DVR/PVR unit 101 accesses the video episode dependency service 113 to determine dependencies. For instance, the DVR/PVR unit 101 accesses the video episode dependency service 113 to determine if a selected episode 7 being broadcast or scheduled to be broadcast is dependent on information provided in one or more previous episodes. The DVR/PVR 101 can retrieve this information from the video episode dependency service 113 for plural video series or for the corresponding video series (e.g., the DVR/PVR unit 101 can fetch dependency information for only the corresponding video series or for multiple video series that include the corresponding video series as if prefetching dependency information for other video series). The DVR/PVR unit 101 stores the dependency information in the storage device 102. The DVR/PVR unit 101 can add the dependency information from the service 113 to the episode dependency information 105, partially overwrite the episode dependency information 105, or entirely overwrite the episode dependency information 105.

The video episode detection unit 104 detects selection of a video and determines if the selected video is an episode in a video series. Example techniques for determining if the selected video is an episode in a series include matching the main title of the selected video to previously aired programs, checking for an episode number and/or episode title, etc. Titles, episode numbers and other program information for a video can be obtained from an EPG, metadata associated with video episodes, data accessed over a network, and/or a third party cable service.

It is determined which, if any, video episodes in a series are dependent on previous episodes. Episodes are dependent on one another if a viewer should watch a previous episode in order to fully understand the content of a subsequent episode (e.g., television drama series, television mini-series, etc.). An episode can be dependent on all of the previous episodes, a subset of the previous episodes, or none of the previous episodes. If the selected video is an episode in a series, the video episode detection unit 104 requests episode dependency information from the video episode dependency service 113. The episode dependency information service 113 may be part of the EPG, data accessed over a network, and/or a third party cable service.

Once the episode dependencies are determined, the previous video episode acquisition unit 108 acquires any previous video episodes that have not already been watched or stored in memory. Viewing behavior data 107 is used to determine whether a user(s) associated with the DVR/PVR unit tends to view episodes of a series in order. If a user indicates (e.g., sets preference) or viewing behavior suggests that a user tends not to adhere to series order, then the DVR/PVR can prompt the user before acquiring an episode or simply not acquire the episode. The video episodes data 106 comprises recorded video episodes and indications of other information about previously viewed episodes. If an episode has been viewed or is already stored in the device, that episode will not be downloaded. The viewing behavior data 107 could be stored locally on the DVR and/or on a backend server at the content provider. In addition, the viewing behavior data 107 and the video episodes data 106 can be represented with a same set of data. For example, the DVR/PVR unit 101 can examine episodes that are currently stored to determine if the user(s) watch episodes without regard to order. In another example, the DVR/PVR unit 101 maintains a counter for dependent episodes in a video series watched without the benefit of the one or more previous episodes. In another example, the DVR/PVR unit 101 maintains a flag, perhaps for each video series, that indicates whether a user(s) has watched a dependent episode of a series without watching a previous episode.

Embodiments do not necessarily retrieve episodes automatically. A DVR/PVR unit can inform a user of dependencies and suggest a particular viewing order. For example, embodiments can display a graphical user interface that indicates selected episode 8 is dependent on episodes 7 and 5 and suggests viewing episodes 5, 7, and 8 in order. The example graphical user interface can prompt the user to direct the unit to fetch the episodes 7 and 5, select which of the previous episodes to retrieve, or to ignore the dependencies and view episode 8. Embodiments can also prevent viewing of an episode that is dependent upon a previous unviewed episode (e.g., not allow a user to view episode 8 until episodes 5 and 7 have been viewed, or at least retrieved).

Although not shown in FIG. 1, the DVR unit 101 includes components for recording and presenting content (e.g., video decoding logic, read/write logic, video tuner(s), etc.). Furthermore, any of the components shown herein can include hardware, firmware, and/or machine-readable media including instructions for performing the operations described herein.

Figure 2:
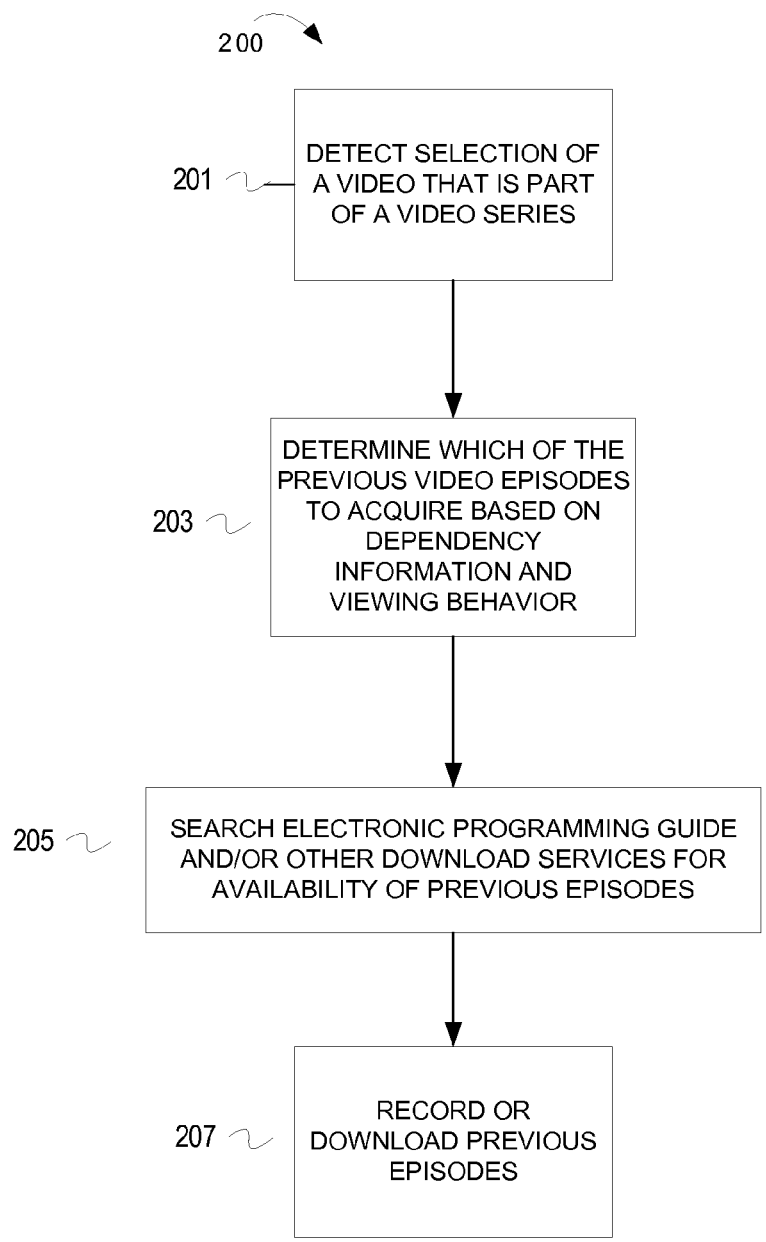
FIG. 2 depicts a flowchart of example operations to acquire previous episodes.

FIG. 2 depicts a flowchart of example operations to acquire previous episodes. Flow 200 begins at block 201, where selection of a video that is part of a video series is detected. Examples of detecting selection of a video include detecting selection of a video for live television viewing, detecting changing live television channels, detecting scheduling of a new recording of a video, etc. Data from various sources (e.g., the EPG, metadata, etc.) indicates the video is part of a series.

At block 203, episode dependency information and viewing behavior are examined to determine which previous episodes to acquire. Dependency information could be acquired from the EPG, and/or a third party service. An example of a third party service includes a service that accumulates episode dependency information from users. For instance, a community of users tag episodes or provide commentary that identifies dependencies among episodes of a series. Another example of a third party service includes a content provider pushing dependency information down to DVRs. An episode could be dependent upon all of the previous episodes or upon a portion of a single previous episode. Viewing behavior data is used to determine if there is a preference and/or tendency to view episodes of video series in order. Information about previously recorded content is also exampled to determine which previous episodes, if any, have already been viewed or acquired.

At block 205, the EPG and other download services are searched for availability of previous episodes. If a rebroadcast of a previous episode is indicated in the EPG, the DVR will schedule a recording of the rebroadcast. If the previous episode is available for download from a web service, the DVR will initiate a download of the previous episode. A user can set various configurations for acquiring a video. For example, configurations can indicate whether recording or downloading is preferred. Configurations can also indicate whether a user is willing to pay for acquisition of an episode, and an acceptable price range(s). At block 207, previous episodes are recorded or downloaded.

Figure 3:
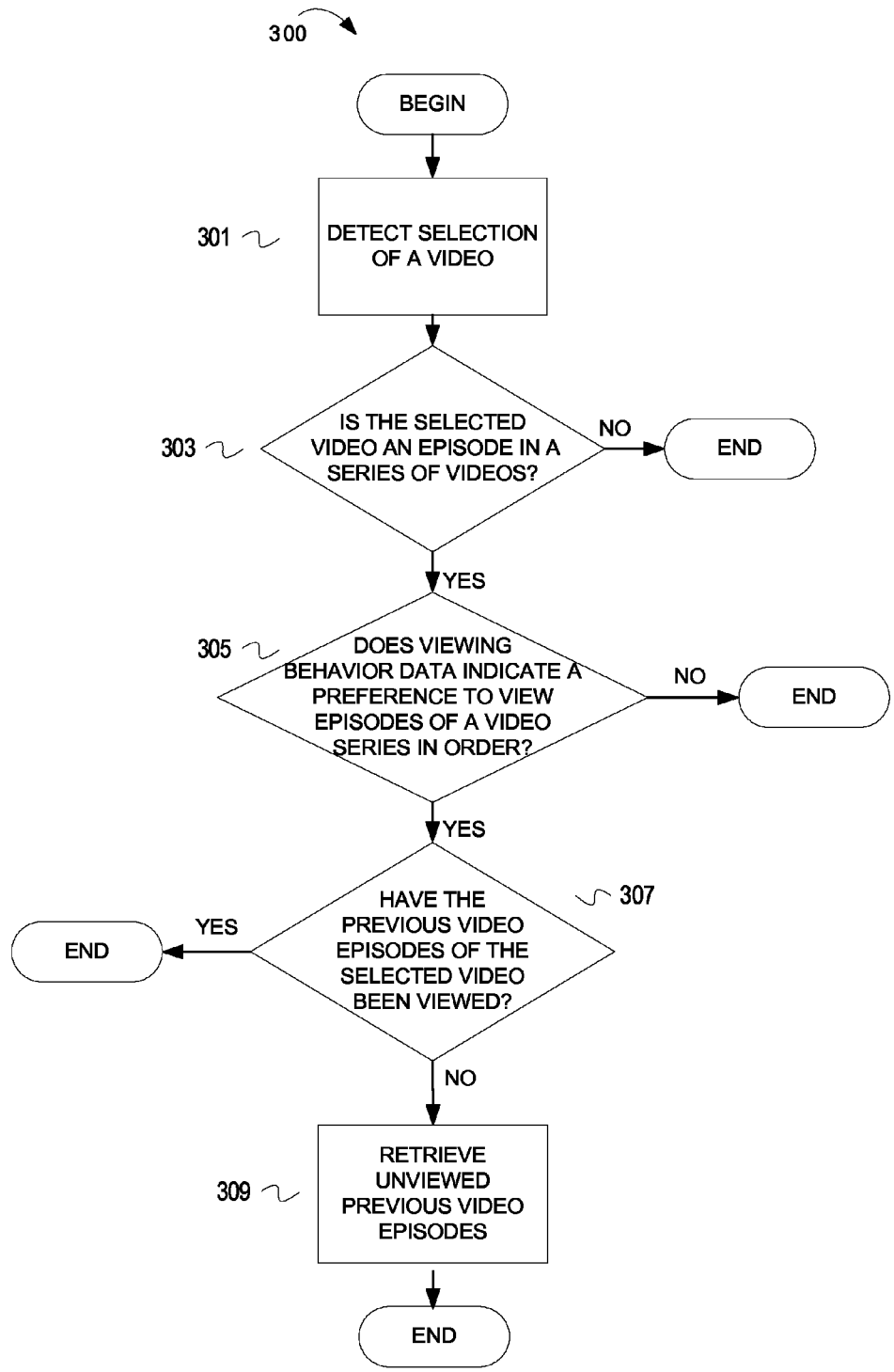
FIG. 3 depicts a flowchart of example operations to acquire previous episodes of a video series.

FIG. 3 depicts a flowchart of example operations to acquire previous episodes of a video series. Flow 300 begins at block 301, where selection of a video from a plurality of video content is detected. Examples of detecting selection of a video include detecting selection of a video for live television viewing, detecting changing live television channels, detecting scheduling of a new recording of a video, etc. At block 303, it is determined if the selected video is an episode in a video series. As an example, a DVR examines an electronic programming guide (EPG). As another example, the DVR accesses a video episode dependency service, which supplies data that indicates dependencies between episodes in a series. If the selected video is not part of a video series, the flow ends. If the selected video is part of a video series, then the flow continues to block 305.

At block 305, it is determined if viewing behavior data indicates a preference to view episodes of a series in order. Example techniques to determine if a viewing behavior data indicates a preference to view video series episodes in order include prompting a user to determine if he/she wants to watch the episodes in order, examining historical data that indicates prior viewing behavior of the video series (or other video series) to check if other episodes have been viewed out of order, etc. If it is determined that viewing behavior data does not indicate a preference to view episodes of a series in order, then the flow ends. If viewing behavior indicates that there is a preference to view the episodes of the series in order, the flow continues at block 307.

At block 307, it is determined if previous video episodes in the series have been viewed. To determine if a video episode has been viewed, a tracking mechanism (e.g., a database) is used to store prior viewing history. This viewing history data could be stored locally on the DVR and/or on a backend server at the content provider. If previous video episodes in the series have been viewed, the flow ends. If previous episodes have not been viewed, flow continues at block 309. At block 309, unviewed previous video episodes are retrieved and the flow ends. For example, these previous video episodes can be obtained by automatically scheduling recording of a rebroadcast. In another example, the previous episodes could be downloaded from a web service.

In some cases, it may not be necessary to acquire all of the previous episodes of a series. For example, episode 3 may be dependent on episode 1, but not episode 2 because episode 2 does not contain information relevant to the content (e.g., storyline) of episode 3. Therefore, only one of the two previous episodes will be acquired.

Figure 4:
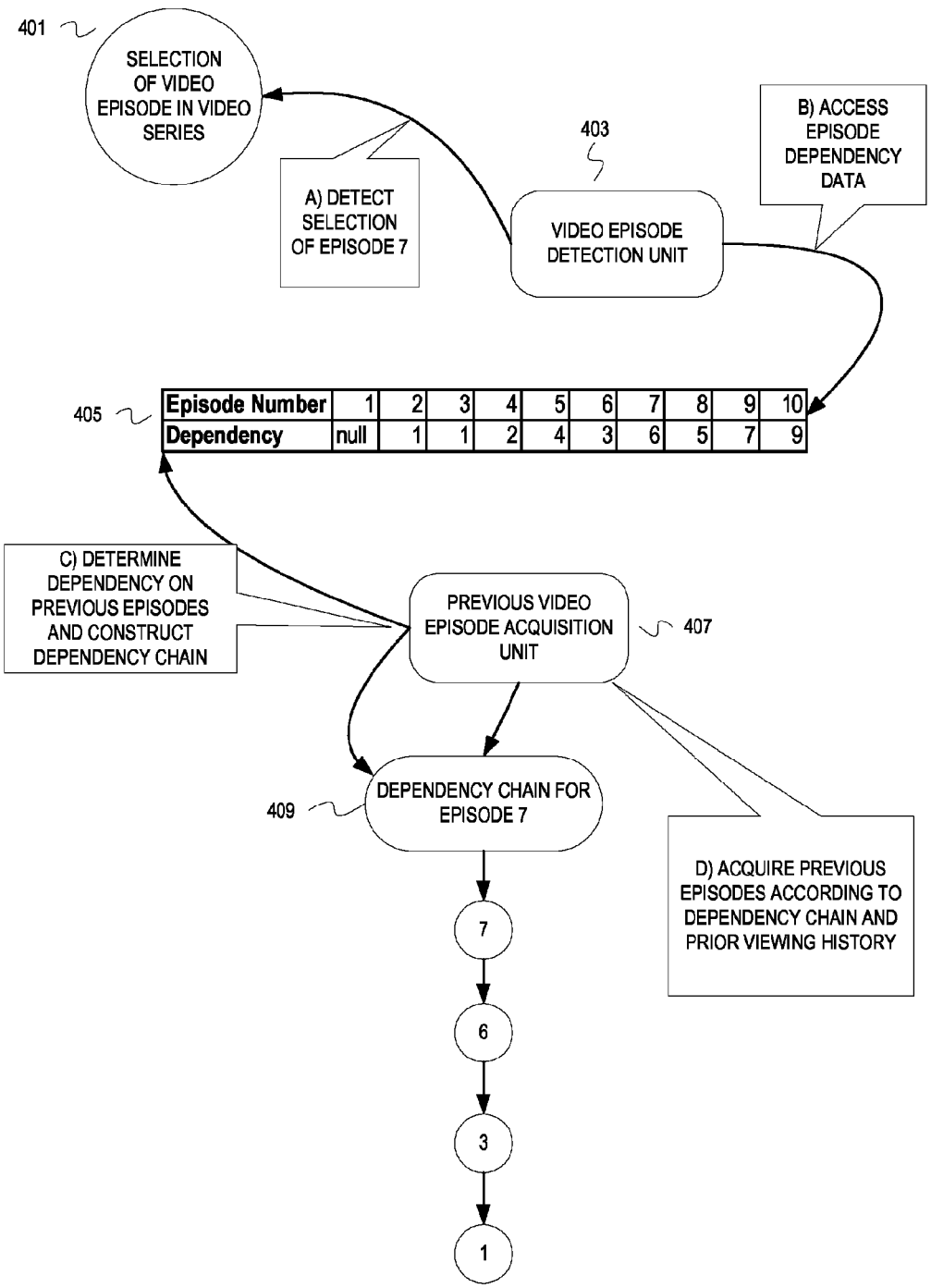
FIG. 4 depicts an example of a dependency matrix for a video series.

FIG. 4 depicts an example of a dependency matrix for a video series. At stage A, a video episode detection unit 403 examines a selection 401 of a video episode of a video series, and detects that episode 7 of the video series has been selected. At stage B, the video episode detection unit 403 accesses episode dependency data 405. The episode dependency data 405 can be obtained from the EPG, metadata associated with video episodes, data accessed over a network, and/or a third party cable service. The dependency data 405 can be every episode in the series that aired before the current selected episode or a subset of the previous episodes that are related to the content of the selected episode. At stage C, a previous video episode acquisition unit 407 determines which previous episodes the selected episode is dependent upon, and builds a dependency chain for episode 7. For example, the previous video episode acquisition unit 407 creates a structure that represents direct and indirect dependencies of episodes from episode 7 while walking the dependency data 405. In some cases, an episode may have more than one dependency chain. As an example, an episode can be dependent upon all of the regular previous episodes of the series or upon a special overview episode. The special overview episode recaps important storyline information from all of the regular previous episodes. The dependency chain indicating the special overview episode is more compact than the chain indicating all regular previous episodes. A user can set configurations with regard to preferred dependency chains. Examples include a user indicating a preference for compact dependency chains, a user indicating a preference for overview episodes, a user indicating a preference for minimal viewing time, etc. A unit or module (e.g., program product or application specific integrated circuit) can automatically request episodes and/or schedule recordings based on various parameters (e.g., total running time of videos in a dependency chain, number of nodes in a dependency chain, etc.). Dependency chain configurations can be applied differently to one or more series or the same to all series. Furthermore, embodiments can also utilize values along with indications of dependencies to indicate a particular quality of a video episode. For example, the special overview episode that recaps a previous season can be associated with a value that identifies it as a recap of the previous season. Embodiments can also associate episodes with values that represent priority and/or relevancy of the episodes. For example, the special overview episode can be given a higher value that suggests greater priority. The individual episodes of the previous season can also be associated with various values that represent their level of relevancy. Although a subject episode may be dependent upon eight episodes of the previous season, some of those previous episodes may only have marginal relevance with respect to a character who is killed off.

At stage D, the previous video episode acquisition unit 407 acquires the previous episodes based on the dependency chain and prior viewing history. Episodes that have not yet been viewed or recorded are acquired by the video acquisition unit 407.

Figure 5:
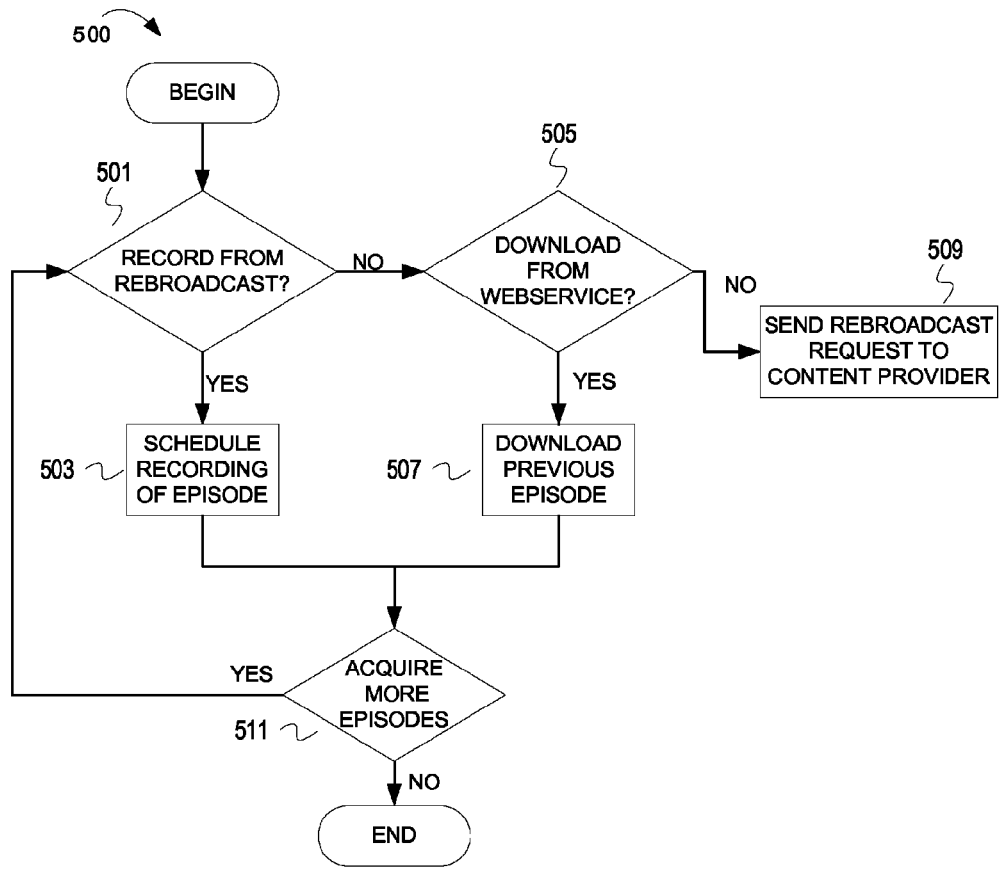
FIG. 5 is flowchart depicting example operations for acquiring previous video episodes of a series of video episodes by recording or downloading.

FIG. 5 is a flowchart depicting example operations for acquiring previous video episodes of a series of video episodes by recording or downloading. Flow 500 begins at block 501, where it is determined if a previous episode can be recorded from a rebroadcast of that episode. For example, a searching mechanism (e.g., implemented in the DVR and/or back-end service) searches an electronic programming guide for a rebroadcast of the previous episode. The electronic programming guide may not indicate a rebroadcast and/or the searching mechanism may limit searching within a given time period. If the previous episode can be recorded, then the flow continues at block 503. At block 503, the DVR schedules recording of the previous episode to be rebroadcast. Flow then continues at block 511.

If a rebroadcast of the previous episode is not or cannot be scheduled for recording, then flow continues at block 505. At block 505, it is determined if the episode can be downloaded from a web service. If the episode can be downloaded from a web service, flow continues to block 507. If the episode cannot be downloaded, flow continues to block 509.

At block 507, the previous episode is downloaded. Control flows from block 507 to block 511.

At block 509, a rebroadcast request is sent to the content provider.

At block 511, it is determined if there are more episodes to acquire. For example, episode 4 may depend on information from both episodes 1 and 3. As another example, episode 4 may depend on information in episode 3, which in turn depends on information in episode 2. If there are more episodes to acquire, flow returns to block 501. If there are no more episodes to acquire, the flow ends.

In block 509, a rebroadcast request is sent to the content provider when an episode cannot be recorded or downloaded. The content provider can use these requests to schedule re-runs of more popular episodes in a series. The number of requests for a specific episode can then be used by the content provider to determine advertising rates for the rebroadcast. Episodes that are more popular (i.e., those episodes with a large number of rebroadcast requests) can be scheduled for rebroadcast at prime times and with larger advertisement rates.

Television viewers want to watch previously broadcast videos for a number of reasons. For example, a viewer may have missed one or more episodes of his or her favorite series. As another example, a viewer may have mistaken the broadcast date of a show. Functionality can be implemented in a video recording device to submit rebroadcast requests for previously broadcast videos to a content provider. The content provider can use the rebroadcast requests to determine popularity of the previously broadcast video and dynamically schedule rebroadcasts of the most popular videos. The rebroadcast requests represent intended viewership of the video and can be leveraged by the content provider when assigning advertisement rates for the rebroadcast.

Figure 6:
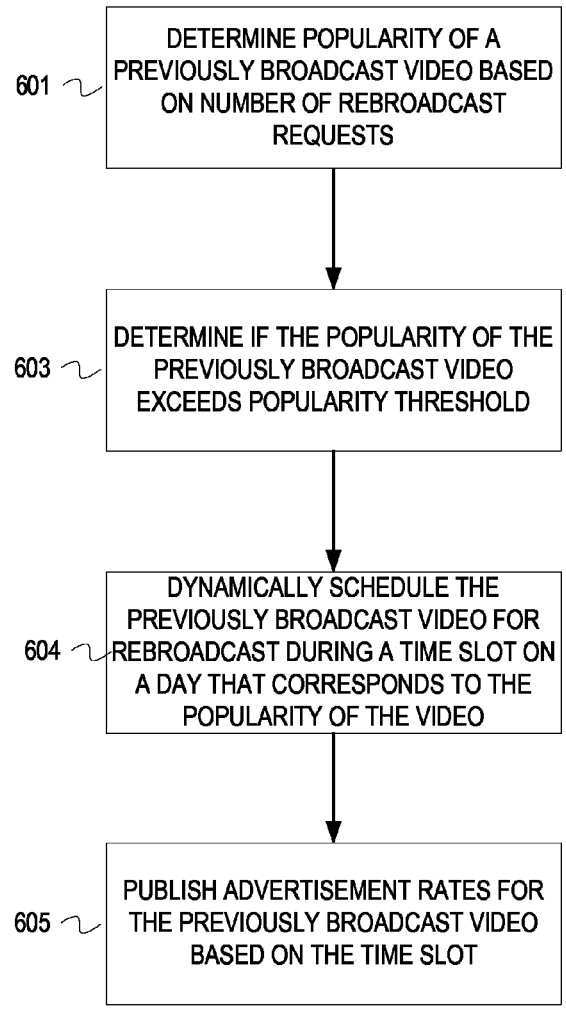
FIG. 6 is a flowchart depicting example operations for dynamically scheduling a rebroadcast of a previously viewed video.

FIG. 6 is a flowchart depicting example operations for dynamically scheduling a rebroadcast of a previously viewed video. Flow starts at block 601, where the popularity of a previously broadcast video is determined. The popularity is based, at least in part, on the number requests to rebroadcast the video. Embodiments can use various techniques to derive popularity from number of rebroadcast requests. For instance, embodiments can use a raw number of requests as an indication of popularity. In another embodiment, a content provider and/or third party service provide collect demographic data and apply the demographic data to the requests to weight requests or modify the numbers.

At block 603, it is determined if the popularity of the previously broadcast video exceeds a popularity threshold. The popularity threshold is set by the content provider as a value (e.g., the number of requests, perhaps adjusted by demographic data) for the video to be eligible for rebroadcast.

At block 604, the previously broadcast video is dynamically scheduled for rebroadcast during a time slot on a day that corresponds to the popularity of the video. The video may be rebroadcast on a special rebroadcast channel, during breaks in broadcasting of new episodes in a series, etc. In embodiments, the time slot is chosen by examining the number of rebroadcast requests and/or the popularity threshold.

At block 605, advertisement rates for the previously broadcast video are published based, at least in part, on the time slot. The advertisement rates correspond to the chosen time slot for the rebroadcast.

Although numerous examples refer to a series, embodiments can request rebroadcast of videos that are not a part of a series. A user can search an EPG for a past broadcast of a standalone video (e.g., documentary, TV movie, debate, etc.). The user can then request rebroadcast of the standalone video.

Figure 7:
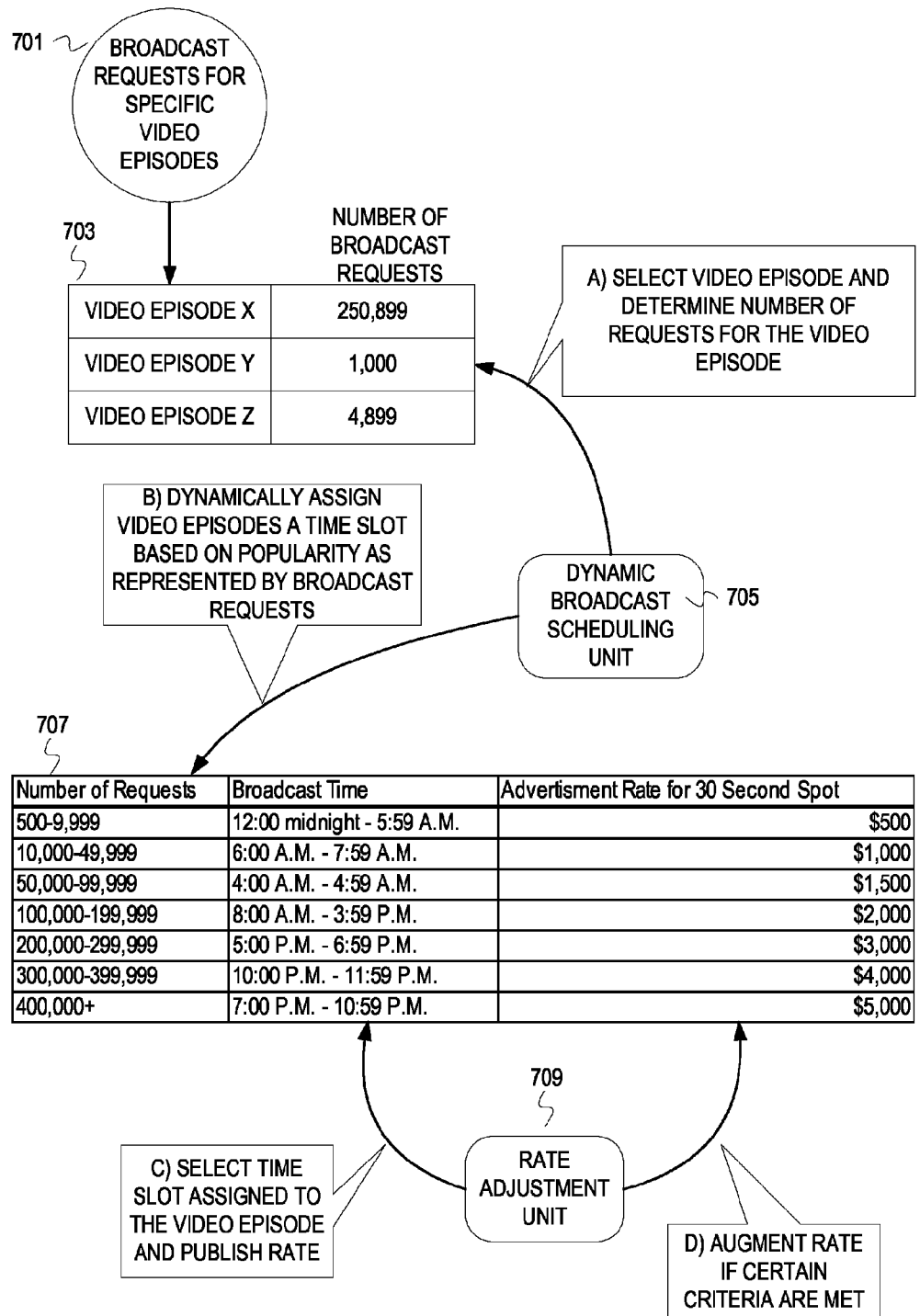
FIG. 7 is an example depiction of the use of rebroadcast requests by a content provider.

FIG. 7 is an example depiction of the use of broadcast requests by a content provider. A content provider receives requests 701 for broadcast of specific episodes. A table 703 indicates the requested episodes and corresponding number of broadcast requests for each episode. In this illustration, the table 703 indicates video episodes X, Y, and Z that have respectively accumulated 250,899 broadcast requests, 1000 broadcast requests, and 4899 broadcast requests. At stage A, a dynamic broadcast scheduling unit 705 determines the number of requests for a specific video episode. A table 707 is an example structure that associates popularity level as represented by ranges of broadcast requests, broadcast time slots, and advertisement rates for 30 second spots within each time slot. At stage B, the dynamic broadcast scheduling unit 705 schedules video episodes in time slots based on popularity level.

At stage C, a rate adjustment unit 709 selects the specific broadcast time slot for the video episode X within the time slot and publishes the advertising rate associated with that time slot. As an example, the rate adjustment unit 709 schedules a broadcast of an episode X at 5:00 p.m. In the table 707, the corresponding advertisement rate for a 30 second spot for broadcasts between 5:00 p.m. and 6:59 p.m. is $3000. The rate adjustment unit will publish a rate of $3000 for a 30 second advertisement during the broadcast of episode X.

At stage D, the rate adjustment unit 709 augments the rate if certain criteria are met. The rate may be augmented for a number of reasons. There may be more episodes that meet the popularity conditions for a specific time slot than can actually be aired within that time slot on any specific day. The content provider can handle this situation in various manners: decide to air episodes that do not fit into the specific day's time slot in the same time slot on another day; air the episodes in a different time slot the same day and augment the base rate for the chosen time slot; etc. The content provider may also decide to accept bids for the most popular time slots based on, or completely independent of, the established rates. The content provider may utilize additional parameters to augment advertisement rates. For instance, there may be certain days of the week that are more popular for viewing than others. The content provider may choose to augment the base time slot rate based on more popular viewing days. In this example, broadcast requests for previous episodes of a video series automatically are sent to the content provider. In another example, requests for any previously aired video may be manually sent to the content provider. Embodiments can use various techniques allowing requests to be submitted and/or handled. Examples of techniques include encoding functionality within an electronic programming guide to submit requests for a video, providing an Internet browser to both search for videos and submit requests for the videos, etc. A user can submit requests for previously aired content or for content (e.g., a movie) that has never been aired.

Embodiments can broadcast the requested episodes on one or more channels available for general viewing as well as DVR recording. However, the content provider may choose to broadcast requested videos on a channel only accessible with a video recording device (e.g., DVR, game console, media center, etc.). The content provider can limit advertisements on the broadcast channel. For example, the content provider can require viewing of an advertisement before viewing the video and/or insert one or more advertisements at a halfway point in the video being broadcast. In addition, the content provided can encode the broadcast to prevent fast-forwarding and/or skipping.

Figure 8:
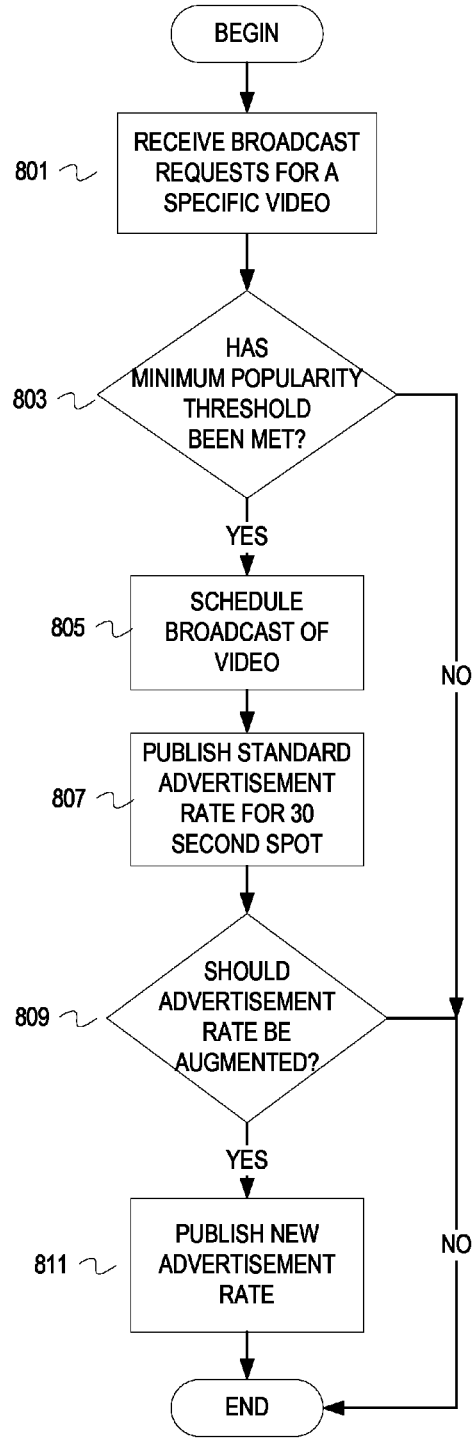
FIG. 8 is a flowchart depicting example operations for dynamically scheduling broadcasts and setting advertisement rates.

FIG. 8 is a flowchart depicting example operations for dynamically scheduling broadcasts and setting advertisement rates. Flow begins at block 801, where a content provider receives broadcast requests for a specific video. The requested video could be any previously aired content or new content that has not been aired.

At block 803, it is determined if the popularity threshold has been reached. To illustrate, a content provider can set the popularity threshold as a number of requests received for a specific video to be eligible for broadcast. If the popularity threshold has been met, then flow continues at block 805. If the popularity threshold has not been met, the flow ends.

At block 805, the video is scheduled for broadcast. Scheduling is in accordance with various parameters. For example, broadcast times are picked based on popularity as represented by the number of rebroadcast requests. At block 807, an advertisement rate for a spot with respect to popularity of the video is determined.

At block 809, it is determined if the advertisement rate should be augmented. The advertisement rate may be augmented based on a variety of parameters. Example parameters include more videos are eligible for a specific time slot than can be accommodated, the video is scheduled to be aired on a more popular day, advertisement space within the broadcast is filling up, etc. If the rate should be augmented, flow continues at block 811. If the rate should not be augmented, the flow ends.

At block 811, the new advertisement rate is published and the flow ends.

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently. For instance, operations in FIG. 3 for determining which previous episodes have been watched and determining to watch episodes in order could be interchanged. Referring to FIG. 4, a mechanism to track the subset of previous episodes that are helpful in viewing the selected episode may not be implemented. In this case, the selected episode would be considered to be dependent on all previous episodes.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 9:
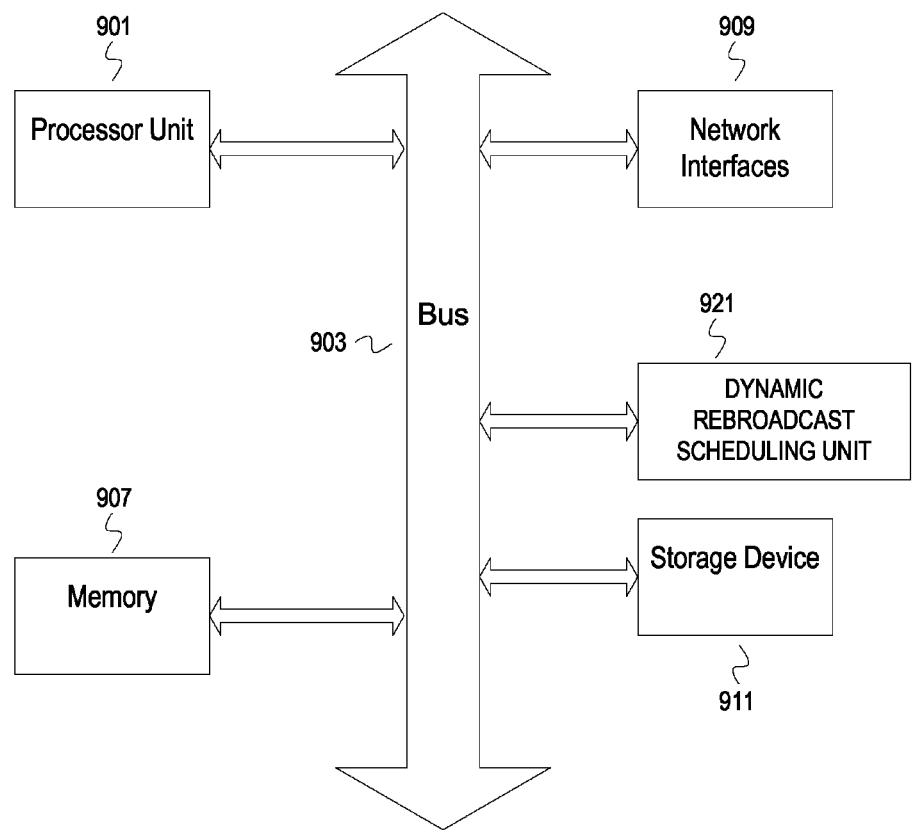
FIG. 9 depicts an example computer system.

FIG. 9 depicts an example computer system. A computer system includes a processor unit 901 (possibly including multiple processors, multiple cores, multiple nodes, and/or implementing multi-threading, etc.). The computer system includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PCI-Express, HyperTransport®, InfiniBand®, NuBus, etc.), a network interface 909 (e.g., an ATM interface, an Ethernet interface, a Frame Relay interface, SONET interface, wireless interface, etc.), an episode order adherence unit 921, and a storage device(s) 911 (e.g., optical storage, magnetic storage, etc.). The dynamic rebroadcast scheduling unit 921 determines popularity of a previously broadcast video, schedules rebroadcast of the video, and publishes advertising rates for the rebroadcast. Some or all of the functionality of the dynamic rebroadcast scheduling unit 921 may be implemented with code embodied in memory and/or a processor, co-processors, other cards, etc. Any one of these functionalities may be partially (or entirely) implemented in hardware and/or on the processing unit 901. For example, the functionality may be implemented with an application specific integrated circuit, in logic implemented in the processing unit 901, in a co-processor on a peripheral device or card, etc. Further, realizations may include fewer or additional components not illustrated in FIG. 9 (e.g., video cards, audio cards, additional network interfaces, peripheral devices, etc.). The processor unit 901, the storage device(s) 911, the dynamic rebroadcast scheduling unit 921, and the network interface 909 are coupled to the bus 903. Although illustrated as being coupled to the bus 903, the memory 907 may be coupled to the processor unit 901.

While the embodiments are described with reference to various implementations and exploitations, it will be understood that these embodiments are illustrative and that the scope of the inventive subject matter is not limited to them. In general, techniques described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for managing rebroadcast of a previously broadcast video, the method comprising:
   determining popularity of the previously broadcast video based, at least in part, on a number of requests to rebroadcast the previously broadcast video;
   determining a popularity threshold based in part on demographics of viewers sending the number of requests to rebroadcast the previously broadcast video;
   determining that the popularity of the previously broadcast video exceeds the popularity threshold, and in response, determining a day of week and time of day to rebroadcast the previously broadcast video based in part on days of the week and times of day in which the requests were sent; and
   rebroadcasting the previously broadcast video at the day of week and the time of day on a channel that is only viewable with a video recording device with a video decoding logic configured to decode the previously broadcast video on the channel.

2. The method of claim 1 further comprising selecting a channel to rebroadcast the previously broadcast video based, at least in part, on channels in which the requests were made.

3. The method of claim 1 further comprising:
determining an advertisement rate for the rebroadcast of the previously broadcast video based on the determined day of week and the time of day to rebroadcast the previously broadcast video and the number of rebroadcast requests, and publishing the advertisement rate.

4. The method of claim 3, wherein determining the popularity threshold comprises determining the popularity threshold by assigning different weights to the number of requests based on the demographics of the viewers sending the number of requests.

5. The method of claim 1 further comprising:
determining that popularity of a second previously broadcast video also exceeds the popularity threshold;
determining that the popularity of the second previously broadcast video is less than the popularity of the first previously broadcast video; and
determining an optimum time to rebroadcast the second previously broadcast video at the time slot on a different channel than the rebroadcast of the first previously broadcast video.

6. The method of claim 1, wherein determining the day of week and the time of day to rebroadcast the first previously broadcast video comprises determining the day of week and the time of day based on the popularity threshold.

7. The method of claim 1, wherein adjusting the popularity threshold comprises weighting the number of requests to rebroadcast the first previously broadcast video based on the demographics of the viewers creating the number of requests to rebroadcast the first previously broadcast video.

8. A computer program product for managing rebroadcast of a previously broadcast video, the computer program product comprising:
program instructions to determine popularity of the previously broadcast video based, at least in part, on a number of requests to rebroadcast the previously broadcast video;
program instructions to determine a popularity threshold based in part on demographics of viewers sending the number of requests to rebroadcast the previously broadcast video;
program instructions to determine that the popularity of the previously broadcast video exceeds the popularity threshold, and in response, the computer determining a day of week and time of day to rebroadcast the previously broadcast video based in part on days of the week and times of day in which the requests were sent; and
program instructions to rebroadcast the previously broadcast video at the day of week and the time of day on a channel that is only viewable with a video recording device with a video decoding logic configured to decode the previously broadcast video on the channel.

9. The computer program product of claim 8 further comprising program instructions to select a channel to rebroadcast the previously broadcast video based, at least in part, on channels in which the requests were made.

10. The computer program product of claim 8, further comprising:
program instructions to determine an advertisement rate for the rebroadcast of the previously broadcast video based on the determined day of week and the time of day to rebroadcast the previously broadcast video and the number of rebroadcast requests, and publish the advertisement rate.

11. The computer program product of claim 10, wherein the program instructions to determine the popularity threshold comprises program instructions to determine the popularity threshold by assigning different weights to the number of requests based on the demographics of the viewers sending the number of requests.

12. The computer program product of claim 8, further comprising:
program instructions to determine that popularity of a second previously broadcast video also exceeds the popularity threshold;
program instructions to determine that the popularity of the second previously broadcast video is less than the popularity of the first previously broadcast video; and
program instructions to determine an optimum time to rebroadcast the second previously broadcast video at the time slot on a different channel than the rebroadcast of the first previously broadcast video.

13. The computer program product of claim 8, wherein the program instructions to determine the day of week and the time of day to rebroadcast the first previously broadcast video comprises program instructions to determine the day of week and the time of day based on the popularity threshold.

14. The computer program product of claim 8, wherein the program instructions to adjust the popularity threshold comprises the computer weighting the number of requests to rebroadcast the first previously broadcast video based on the demographics of the viewers creating the number of requests to rebroadcast the first previously broadcast video.

15. An apparatus for managing rebroadcast of a previously broadcast video, the apparatus comprising:
one or more processor units, one or more computer-readable memories, one or more computer-readable storage devices, and program instructions, stored on the one or more storage devices for execution by the one or more processor units via the one or more memories, the program instructions comprising:
program instructions to determine popularity of the previously broadcast video based, at least in part, on a number of requests to rebroadcast the previously broadcast video;
program instructions to determine a popularity threshold based in part on demographics of viewers sending the number of requests to rebroadcast the previously broadcast video;
program instructions to determine that the popularity of the previously broadcast video exceeds the popularity threshold, and in response, the computer determining a day of week and time of day to rebroadcast the previously broadcast video based in part on days of the week and times of day in which the requests were sent; and
program instructions to rebroadcast the previously broadcast video at the day of week and the time of day on a channel that is only viewable with a video recording device with a video decoding logic configured to decode the previously broadcast video on the channel.

16. The apparatus of claim 15, further comprising program instructions to select a channel to rebroadcast the previously broadcast video based, at least in part, on channels in which the requests were made.

17. The apparatus of claim 15, further comprising:
program instructions to determine an advertisement rate for the rebroadcast of the previously broadcast video based on the determined day of week and the time of day to rebroadcast the previously broadcast video and the number of rebroadcast requests, and publish the advertisement rate.

18. The apparatus of claim 17, wherein the program instructions to determine the popularity threshold comprises program instructions to determine the popularity threshold by assigning different weights to the number of requests based on the demographics of the viewers sending the number of requests.

19. The apparatus of claim 15, further comprising:
program instructions to determine that popularity of a second previously broadcast video also exceeds the popularity threshold;
program instructions to determine that the popularity of the second previously broadcast video is less than the popularity of the first previously broadcast video; and
program instructions to determine an optimum time to rebroadcast the second previously broadcast video at the time slot on a different channel than the rebroadcast of the first previously broadcast video.

20. The apparatus of claim 15, wherein the program instructions to adjust the popularity threshold comprises the computer weighting the number of requests to rebroadcast the first previously broadcast video based on the demographics of the viewers creating the number of requests to rebroadcast the first previously broadcast video.

* * * * *